US012725568B2

(12) United States Patent
Hwang et al.

(10) Patent No.: US 12,725,568 B2
(45) Date of Patent: Sep. 1, 2026

(54) APPARATUS AND METHOD FOR SELECTIVELY CONTROLLING DISPLAY PIXELS

(71) Applicant: SAPIEN SEMICONDUCTORS INC., Gyeonggi-do (KR)

(72) Inventors: Sung Ho Hwang, Gyeonggi-do (KR); Hye Min Bae, Gyeonggi-do (KR); Jihaeng Lee, Gyeonggi-do (KR); Dae Young Jung, Gyeonggi-do (KR)

(73) Assignee: SAPIEN SEMICONDUCTORS INC., Seongnam-si (KR)

( * ) Notice: Subject to any disclaimer, the term of this patent is extended or adjusted under 35 U.S.C. 154(b) by 0 days.

(21) Appl. No.: 19/217,326

(22) Filed: May 23, 2025

(65) Prior Publication Data

US 2025/0363937 A1 Nov. 27, 2025

(30) Foreign Application Priority Data

May 24, 2024 (KR) ........................ 10-2024-0067632
Jul. 4, 2024 (KR) ........................ 10-2024-0087914

(51) Int. Cl.
*G09G 3/32* (2016.01)

(52) U.S. Cl.
CPC ........... *G09G 3/32* (2013.01); *G09G 2310/08* (2013.01); *G09G 2330/021* (2013.01)

(58) Field of Classification Search
CPC ................. G09G 3/32; G09G 2310/08; G09G 2330/021; G09G 3/3233
See application file for complete search history.

(56) References Cited

U.S. PATENT DOCUMENTS

| | | | | |
|---|---|---|---|---|
| 10,079,000 | B2 * | 9/2018 | Zheng | G09G 5/14 |
| 10,685,625 | B2 * | 6/2020 | Shim | G09G 5/12 |
| 11,688,333 | B1 * | 6/2023 | Boecker | H01L 25/162 345/691 |
| 11,741,870 | B2 * | 8/2023 | Kim | H05K 5/0017 345/173 |
| 12,190,796 | B2 * | 1/2025 | Jung | G09G 3/2033 |
| 2007/0206000 | A1 * | 9/2007 | Haukijarvi | G06T 3/403 345/418 |
| 2009/0002351 | A1 * | 1/2009 | Kim | G09G 3/3648 345/204 |
| 2010/0079685 | A1 * | 4/2010 | Endo | C07D 401/12 359/292 |

(Continued)

FOREIGN PATENT DOCUMENTS

| | | |
|---|---|---|
| JP | H05216617 | 8/1993 |
| KR | 20070028839 | 3/2007 |
| KR | 1020220092329 | 7/2022 |

*Primary Examiner* — Benyam Ketema
(74) *Attorney, Agent, or Firm* — NKL Law; Jae Youn Kim

(57) ABSTRACT

A pixel driving circuit for a display device includes a data driving circuit configured to output control signals indicating operation modes and a data signal indicating image data through a column line or a row line, and an array of a plurality of pixels, each pixel including a light-emitting element, and a pixel-embedded memory configured to receive the data signal from the column or row line via a first signal path, and configured to store the image data to drive the light-emitting element of a pixel, and a signal distributor configured to connect the first signal path to or disconnect the first signal path from the column or row line based on the operation modes.

9 Claims, 14 Drawing Sheets

(56) References Cited

U.S. PATENT DOCUMENTS

2010/0271408 A1* 10/2010 Lin ..................... G09G 3/3446 345/107
2010/0321402 A1* 12/2010 Han ..................... G06F 3/147 345/619
2011/0080392 A1* 4/2011 Hare ..................... G09G 3/344 345/208
2011/0084979 A1* 4/2011 Rutman ..................... G09G 3/344 345/694
2012/0268500 A1* 10/2012 Chang ..................... G09G 3/344 345/690
2014/0267336 A1* 9/2014 Jeganathan ..................... G09G 5/395 345/545
2016/0133196 A1* 5/2016 Emelie ..................... G09G 3/344 345/107
2016/0203767 A1* 7/2016 Yamazaki ..................... G09G 3/344 345/107
2016/0372054 A1* 12/2016 Yamazaki ..................... G09G 3/344
2017/0098416 A1* 4/2017 Taylor ..................... G09G 3/344
2017/0187976 A1* 6/2017 Cok ..................... G09G 3/20
2018/0102085 A1* 4/2018 Pan ..................... G09G 3/3291
2018/0114800 A1* 4/2018 Pan ..................... H10H 29/142
2018/0191978 A1* 7/2018 Cok ..................... H04N 25/779
2018/0376090 A1* 12/2018 Liu ..................... H04N 25/616
2019/0041955 A1* 2/2019 Kwa ..................... G06F 1/3218
2019/0197960 A1* 6/2019 Kim ..................... G09G 3/3266
2019/0347979 A1* 11/2019 Ahmed ..................... H10K 59/35
2021/0005144 A1* 1/2021 Long ..................... G09G 3/3266
2021/0035498 A1* 2/2021 Chang ..................... G09G 3/20
2021/0233463 A1* 7/2021 Lee ..................... G09G 3/2022
2022/0101784 A1* 3/2022 Lee ..................... G09G 3/2022
2022/0293043 A1* 9/2022 Lee ..................... G09G 3/32
2022/0415245 A1* 12/2022 Lee ..................... G09G 3/2014
2023/0016573 A1* 1/2023 Goetz ..................... G09G 3/2014
2023/0154387 A1* 5/2023 Lee ..................... G09G 3/3275 345/55
2023/0282150 A1* 9/2023 Kyles ..................... G09G 3/2014 345/204
2023/0290304 A1* 9/2023 Kim ..................... G09G 3/3233
2023/0316996 A1* 10/2023 Ozbas ..................... G09G 3/3208 345/214
2023/0386424 A1* 11/2023 Sasaki ..................... G09G 3/3648
2024/0038173 A1* 2/2024 Kim ..................... G09G 3/3233
2024/0169892 A1* 5/2024 Huo ..................... G09G 3/32
2024/0331640 A1* 10/2024 Zhang ..................... G09G 3/32
2025/0022399 A1* 1/2025 Cheng ..................... G09G 3/2092
2025/0028952 A1* 1/2025 Lee ..................... G06N 3/098
2025/0078733 A1* 3/2025 Cok ..................... H10H 20/855
2025/0209962 A1* 6/2025 Akimoto ..................... G09G 3/32
2025/0209975 A1* 6/2025 Akimoto ..................... G09G 3/2003
2025/0239212 A1* 7/2025 Akimoto ..................... G09G 3/2003
2025/0285580 A1* 9/2025 Kim ..................... G09G 3/3233

* cited by examiner

APPARATUS AND METHOD FOR SELECTIVELY CONTROLLING DISPLAY PIXELS

CROSS-REFERENCE TO RELATED APPLICATION

This application claims priority from and the benefit of Korean Patent Application No. 10-2024-0067632 filed on May 24, 2024 and Korean Patent Application No. 10-2024-0087914 filed on Jul. 4, 2024, in the Korean Intellectual Property Office, the disclosures of which are incorporated herein by reference.

TECHNICAL FIELD

Example embodiments relate to digital display systems, and more particularly, to a pixel driving circuit and a display device including display pixels.

BACKGROUND

A display device may include a plurality of display pixels. The display pixels may be arranged in M×N rows and columns. Each display pixel may include at least one light-emitting element and may generally be composed of three light-emitting elements (R, G, and B). Here, the three light-emitting elements may be referred to as sub-pixels.

The display device may be applied to a wide range of fields, from small mobile devices to large outdoor display devices. In particular, displays are increasingly utilized in various applications, including vehicle devices, augmented reality (AR) devices, and virtual reality (VR) devices.

Accordingly, improvements in various aspects, such as different display areas, various forms, high resolution, processing time, manufacturing cost, high reliability, and fast response speed, are still required.

Additionally, power consumption management of the display device may require control of the driving circuit, and depending on the application being displayed, a method for selectively controlling the display pixels may be required.

BRIEF SUMMARY

One objective of the present disclosure is to provide a digital display system capable of improving the power consumption of a display device and selectively controlling display pixels according to applications through embodiments.

In one aspect, a pixel driving circuit for a display device includes a data driving circuit configured to output control signals indicating operation modes and a data signal indicating image data through a column line or a row line, and an array of a plurality of pixels, each pixel including a light-emitting element, and a pixel-embedded memory configured to receive the data signal from the column or row line via a first signal path, and configured to store the image data to drive the light-emitting element of a pixel, and a signal distributor configured to connect the first signal path to or disconnect the first signal path from the column or row line based on the operation modes.

In another aspect, a pixel driving circuit for a display device according to an embodiment of the present disclosure includes: a reset controller configured to generate a reset signal based on a row signal and a column signal input from a host of the display device, wherein the reset signal selectively activates data updates for display pixels; a signal distributor configured to route the row signal and column signal along distinct signal paths in response to the reset signal; a pixel-embedded memory including a data memory and a register, wherein the data memory storing multi-bit digital data representing gray-scale levels, and wherein the register storing control data related to driving a light-emitting element and being selectively connected to the signal distributor; and a counter operatively connected to the signal distributor and configured to measure a data write time period for the pixel-embedded memory during a partial data writing mode, wherein the partial data writing mode enables selective data updates for a subset of display pixels.

In the partial data writing mode, the row signal may be input as a first signal pattern including a logic-low time period when display pixels requiring data updates are included in the same row line, and in the partial data writing mode, the row signal may be input as a second signal pattern without the logic-low time period when no display pixels requiring data updates are included in the same row line.

In the partial data writing mode, the column signal comprises: a third signal pattern including N toggle cycles, the third signal pattern transmitted to display pixels requiring data updates within the logic-low time period; and a fourth signal pattern including M toggle cycles, the fourth signal pattern transmitted to display pixels not requiring data updates within the logic-low time period, wherein $M<N$.

The reset controller may be configured to: generate a first reset signal terminating the partial data writing mode when the column signal completes M toggle cycles within the logic-low time period, wherein $M\geq 3$; and generate a second reset signal terminating data writing to the pixel-embedded memory when the column signal completes N toggle cycles within the logic-low time period, wherein $N>M$.

The reset controller may be further configured to generate a third reset signal initializing the register when the column signal completes K toggle cycles within the logic-low time period, wherein $K>N$.

The signal distributor may be configured to: output or block the row signal and the column signal to the pixel-embedded memory based on a first flag signal, a second flag signal, and a third flag signal corresponding to the first reset signal, the second reset signal, and the third reset signal, respectively, and output or block the row signal to the counter based on the first flag signal, the second flag signal, and the third flag signal.

The signal distributor may be further configured to block the row signal and column signal output to the pixel-embedded memory and output the row signal to the counter when the partial data writing mode is activated by the first flag signal and the data memory writing mode is deactivated by the second flag signal.

The counter may be configured to count the time at which data writing for the display pixels requiring data updates in the display device is completed based on the row signal.

A display device according to another embodiment of the present disclosure includes a display panel including an array of a plurality of pixel driving circuits arranged to form rows and columns, a scan driving circuit configured to sequentially output row signals to the pixel driving circuits arranged in a row direction within the array included in the display panel, and a data driving circuit configured to output column signals related to driving light-emitting elements corresponding to each of the plurality of pixel driving circuits to the pixel driving circuits arranged in a column direction within the array included in the display panel, wherein each of the plurality of pixel driving circuits comprises: a signal distributor configured to determine a signal path based on a reset signal that is generated to selectively drive data updates for a display pixel; a memory selectively connected to the signal distributor; and a counter configured to count a predetermined data write time for the pixel-embedded memory in a partial data writing mode for selectively driving data updates for at least one display pixel of the display device.

A method for operating a pixel driving circuit includes receiving a row signal and a column signal from a host controller of a display device; generating a reset signal to activate a partial data writing mode for selectively updating a subset of display pixels; routing the row signal and column signal to either a memory module or a counter based on the reset signal; storing image data in a pixel-embedded memory for display pixels requiring updates; retaining prior image data in the pixel-embedded memory for display pixels not requiring updates; and measuring a data write time period for the subset of display pixels using the counter. The method may further include terminating the partial data writing mode when the column signal completes M toggle cycles within a logic-low interval of the row signal; and terminating data writing to the pixel-embedded memory when the column signal completes N toggle cycles within the logic-low interval, wherein N>M.

According to an embodiment of the present disclosure, a partial data writing mode may be provided, and power consumption of the display device may be improved through the partial data writing mode.

Additionally, according to an embodiment of the present disclosure, more precise and error-free data writing timing control can be achieved in the partial data writing mode.

BRIEF DESCRIPTION OF THE FIGURES

Embodiments will be described in more detail with regard to the figures, wherein like reference numerals refer to like parts throughout the various figures unless otherwise specified, and wherein.

DETAILED DESCRIPTION OF THE DISCLOSURE

Figure 1:
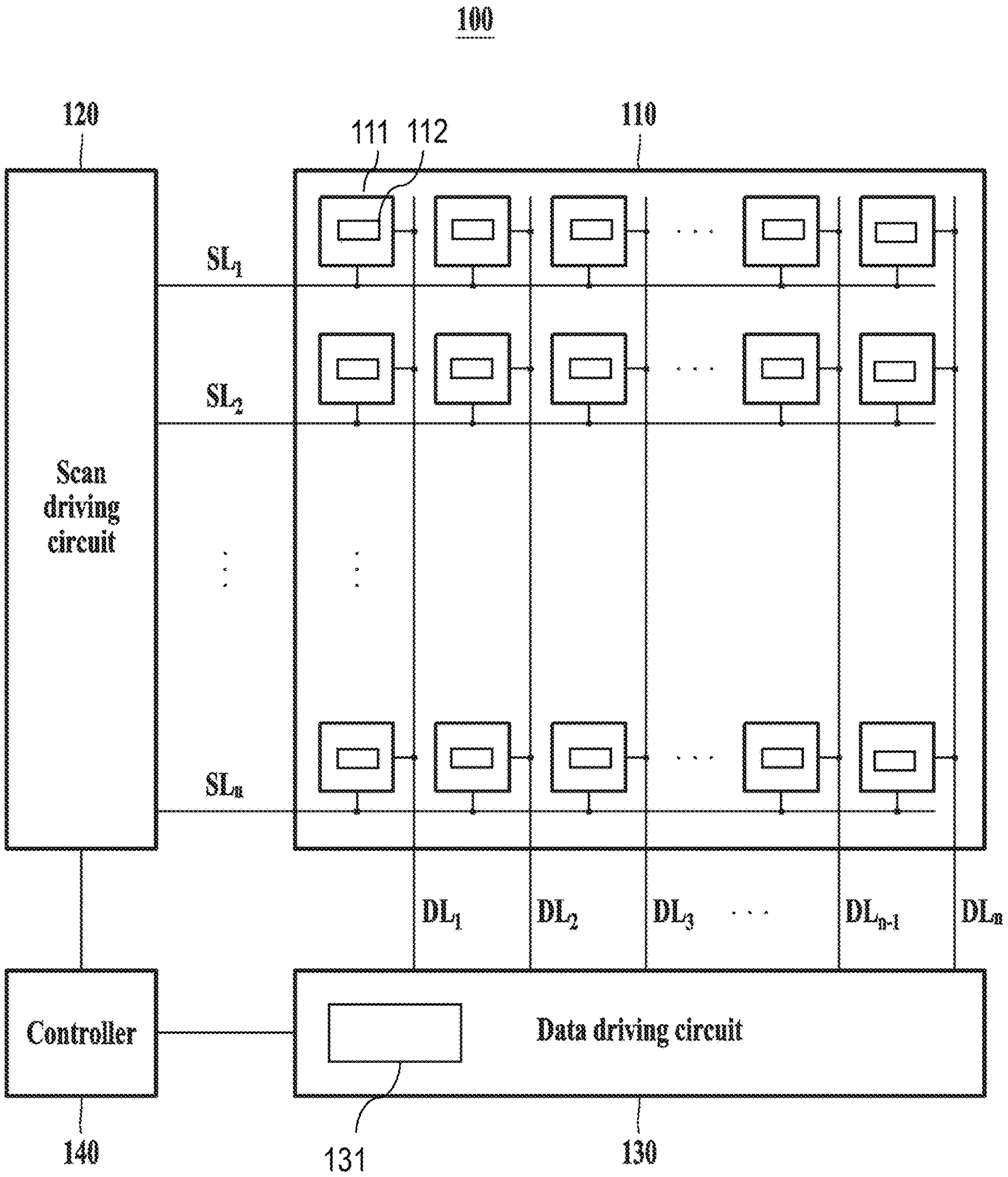
FIGS. 1 and 2 illustrate an example configuration of a display device including a pixel driving circuit according to an embodiment of the present disclosure.

The structural or functional descriptions provided herein are merely illustrative for the purpose of explaining embodiments according to the concept of the present disclosure. The embodiments according to the concept of the present disclosure may be implemented in various forms and are not limited to the embodiments described in this specification.

Since the embodiments according to the concept of the present disclosure may undergo various modifications and take on different forms, they are illustrated in the drawings and described in detail in this specification. However, this is not intended to limit the embodiments according to the concept of the present disclosure to specific disclosed forms, but rather to include modifications, equivalents, or alternatives that fall within the spirit and scope of the present disclosure.

Although terms such as "first" or "second" may be used to describe various components, these components should not be limited by such terms. These terms are used solely to distinguish one component from another. For example, without departing from the scope of the concept of the present disclosure, a "first" component may be referred to as a "second" component, and similarly, a "second" component may also be referred to as a "first" component.

When an element is referred to as being "connected to" or "coupled to" another element, it should be understood that the element may be directly connected or coupled to the other element, or there may be intervening elements present. In contrast, when an element is referred to as being "directly connected to" or "directly coupled to" another element, it should be understood that there are no intervening elements present. Expressions describing relationships between components, such as "between" and "immediately between" or "adjacent to," should be interpreted in the same manner.

The terminology used in this specification is for the purpose of describing particular embodiments only and is not intended to limit the present disclosure. Unless the context clearly indicates otherwise, singular expressions include plural forms as well. The terms "include" and "have," as used herein, are intended to specify the presence of stated features, numbers, steps, operations, components, elements, or combinations thereof, but do not preclude the possibility of the presence or addition of one or more other features, numbers, steps, operations, components, elements, or combinations thereof.

Unless otherwise defined, all terms used herein, including technical and scientific terms, have the same meanings as those generally understood by one of ordinary skill in the art to which the present disclosure pertains. Terms defined in commonly used dictionaries should be interpreted to have meanings consistent with the contextual meaning in the relevant technology and should not be interpreted in an overly idealized or formal manner unless explicitly defined otherwise in this specification.

Hereinafter, embodiments will be described in detail with reference to the accompanying drawings. However, the scope of the patent application is not limited or restricted by these embodiments. Identical reference numerals provided in each drawing indicate identical elements.

Figure 2:
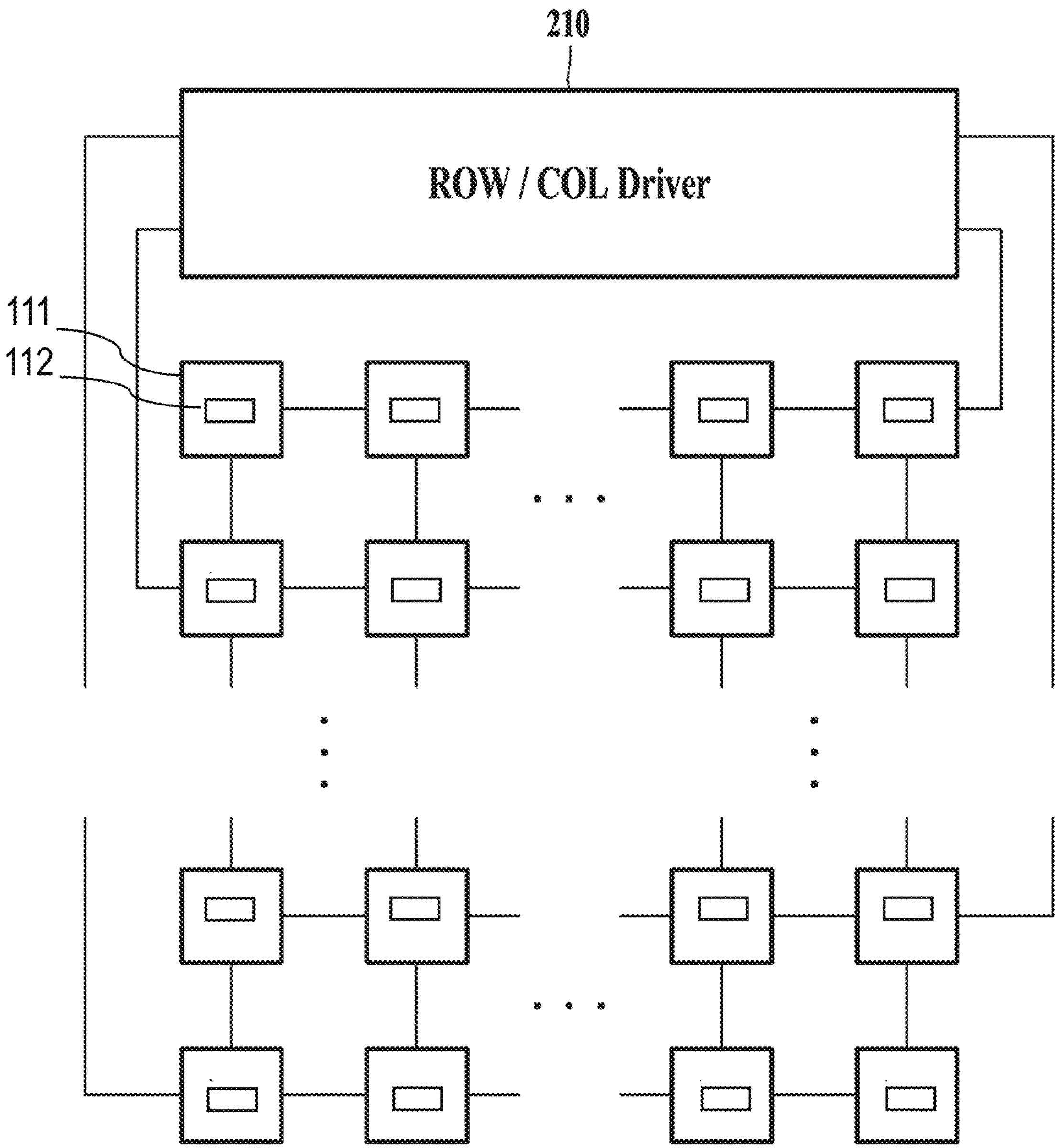

FIGS. 1 and 2 illustrate the configuration of a display device including a pixel driving circuit according to an embodiment of the present disclosure.

Referring to FIG. 1, the display device 100 may include a display panel 110, a scan driving circuit 120, a data driving circuit 130, and a controller 140. In this specification, the scan driving circuit 120 may also be referred to as a row driving circuit, and the data driving circuit 130 may also be referred to as a column driving circuit.

The display panel 110 may include a plurality of pixels (PX). In one embodiment, an array of the plurality of pixels (PX) 111 may be arranged in an M×N matrix (where M and N are natural numbers). However, the arrangement of the plurality of pixels (PX) is not limited to a matrix and may follow various patterns, such as a zigzag pattern, according to other embodiments.

Each of the plurality of pixels (PX) 111 may include at least one light-emitting element. In one embodiment, the light-emitting element may be a light-emitting diode (LED). The LED may be a micro LED with a size of 80 μm or less.

Each pixel (PX) 111 may include a pixel driving circuit that drives the light-emitting elements, i.e., sub-pixels, included in the pixel. The pixel drive circuit may include a pixel embedded memory 112 that stores pixel image data to drive the light-emitting device.

The display panel 110 may include at least one scan line (SL1~SLm) arranged in a row direction and at least one data line (DL1~DLn) arranged in a column direction. Each pixel (PX) may be connected to one of the scan lines (SLk) and one of the data lines (DLk). The at least one scan line (SL1~SLm) may be connected to the scan driving circuit 120, and the at least one data line (DL1~DLn) may be connected to the data driving circuit 130.

The scan driving circuit 120 may output a row signal that enables one or more pixels connected to one of the scan lines (SL1~SLm) to be driven.

The data driving circuit 130 may include a memory 131 that stores entire image data to be displayed on the array of the plurality of pixels 111 in frame units. The data driving circuit 130 may divide the entire image data into pixel gradation data for each pixel under the control of the controller 140, and output signals (e.g., column signals) indicating pixel gradation data through one or more data lines (DL1~DLn) to each pixel. That is, the column signals may correspond to the bit values of image data.

FIG. 2 illustrates a display device having a driving circuit 210 in which the scan driving circuit 120, the data driving circuit 130, and the controller 140 are integrated into a single module (or chip).

In this disclosure, at least one of the scan driving circuit 120, the data driving circuit 130, the controller 140, or the driving circuit 210 may be referred to as the "host of the display device." For example, for convenience of description, it may be expressed as "the pixel driving circuit included in the display pixels receives a row signal and a column signal from the host."

Figure 3:
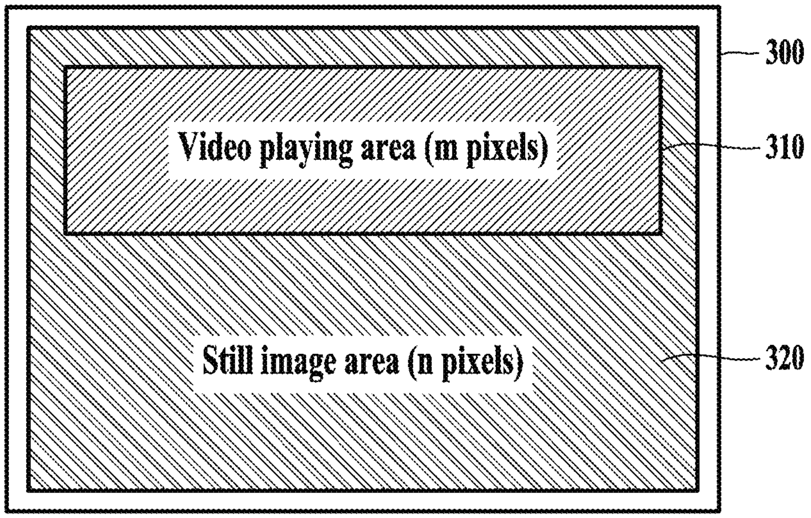
FIG. 3 is an example diagram for explaining an example of selectively controlling display pixels in a display device according to an embodiment of the present disclosure.

FIG. 3 is an example diagram for selectively controlling display pixels in a display device according to an embodiment of the present disclosure.

Referring to FIG. 3, the controller 140 may compare sequential images. Based on a result of the comparison, the display area on the display panel 300 may be divided into a first region 310, where image data frequently needs to be updated, such as video images, and a second region 320, where image data rarely needs to be updated, such as still images. In the second region 320, the image data stored in a pixel-embedded memory may not need to be updated. Subsequently, the controller 140 may output, via the data driving circuit, a first control signal indicating the partial update mode to pixels within the first region, and a second control signal indicating the partial non-update mode to the pixels within the second region.

The pixel-embedded memory may store n-bit image data applied through the column line during a data writing time period. The pixel-embedded memory may store at least 1-bit data. Depending on the driving frequency, the pixel-embedded memory may be implemented as a memory with fewer than n bits.

The pixel-embedded memory may include a shift register and may be implemented using one or more transistors. Additionally, the pixel-embedded memory may be implemented as random access memory (RAM), such as SRAM or DRAM.

For example, the first region 310 may be an area where a YouTube video is being played, while the second region 320 may be an area displaying YouTube comments or thumbnails.

Additionally, depending on the application, the first region 310 may be an area displaying the second hand of a digital clock, while the second region 320 may be an area displaying the hour hand or the minute hand of the clock.

A conventional pixel driving circuit performs a writing operation to update image data at regular time periods, regardless of the distinction between the first region 310 and the second region 320.

If the display pixels may be selectively controlled, the number of writing operations required for image data updates may be reduced, thereby decreasing the power consumption of the display device.

For example, if the number of display pixels in the first region is denoted as m, and the number of display pixels in the second region is denoted as n, the power consumption of the display device may be reduced according to the ratio of m to n.

Figure 4:
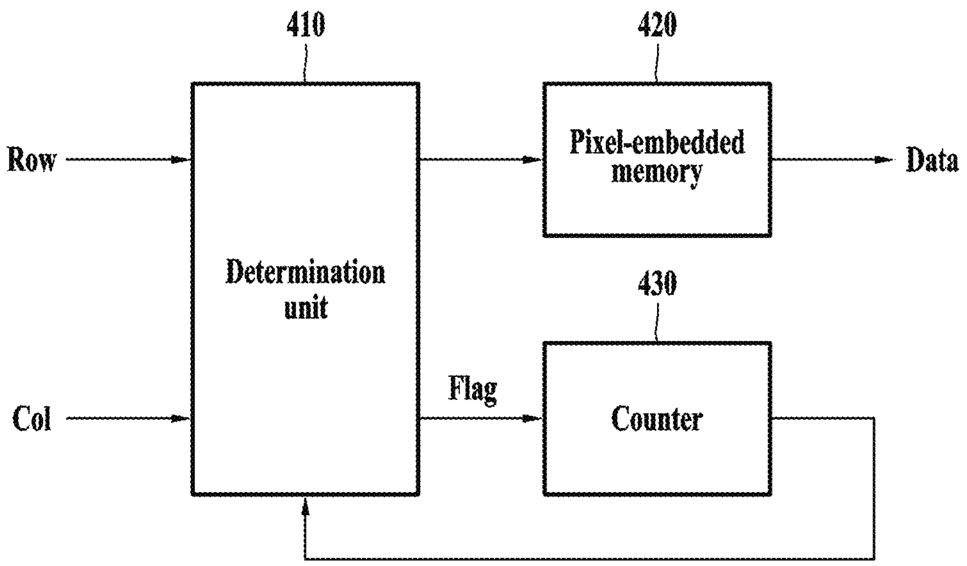
FIG. 4 illustrates an example schematic configuration of a pixel driving circuit according to an embodiment of the present disclosure.

FIG. 4 illustrates a schematic configuration of a pixel driving circuit according to an embodiment of the present disclosure.

Referring to FIG. 4, the pixel driving circuit includes a determination unit 410, a pixel-embedded memory 420, and a counter 430.

The determination unit 410 determines whether a partial data writing mode is activated for selectively driving data updates for at least one display pixel of the display device based on a row signal and a column signal. In the partial data writing mode, the pixels selected for updating pixel data in respective pixel-embedded memories are operated in the partial update mode, and the other pixels are operated in the partial non-update mode. The data driving unit may transmit, via a row or column line, a first control signal indicating the partial update mode and a second control signal indicating the partial non-update mode, to each pixel in the first and second regions.

For example, if a display pixel incorporating the pixel driving circuit corresponds to the second region 320 of FIG. 3, image updates may not be required. However, if another display pixel connected to the same row line or the same column line corresponds to the first region 310 of FIG. 3, the pixel driving circuit may operate in the partial data writing mode.

The pixel-embedded memory 420 may store image data inputted through the column line. When the pixel driving mode is the partial data writing mode, the pixel-embedded memory 420 may either receive new pixel image data and update the memory data if the pixel drive circuit is operated in the partial update mode or maintain the previously stored pixel image data without performing a new image data writing operation if the pixel drive circuit is operated in the partial non-update mode. The pixel driving circuit may continue to drive the light-emitting element using the previously stored image data.

The counter 430 may count the data writing time for updating the image data stored in the pixel-embedded memory 420. By using the counter 430, when a display pixel incorporating the pixel driving circuit corresponds to the second region 320 of FIG. 3 in the partial data writing mode, the counter may count the image data writing time of other display pixels. Accordingly, the counter 430 may count the data writing time of other display pixels connected to the same row line.

Figure 5:
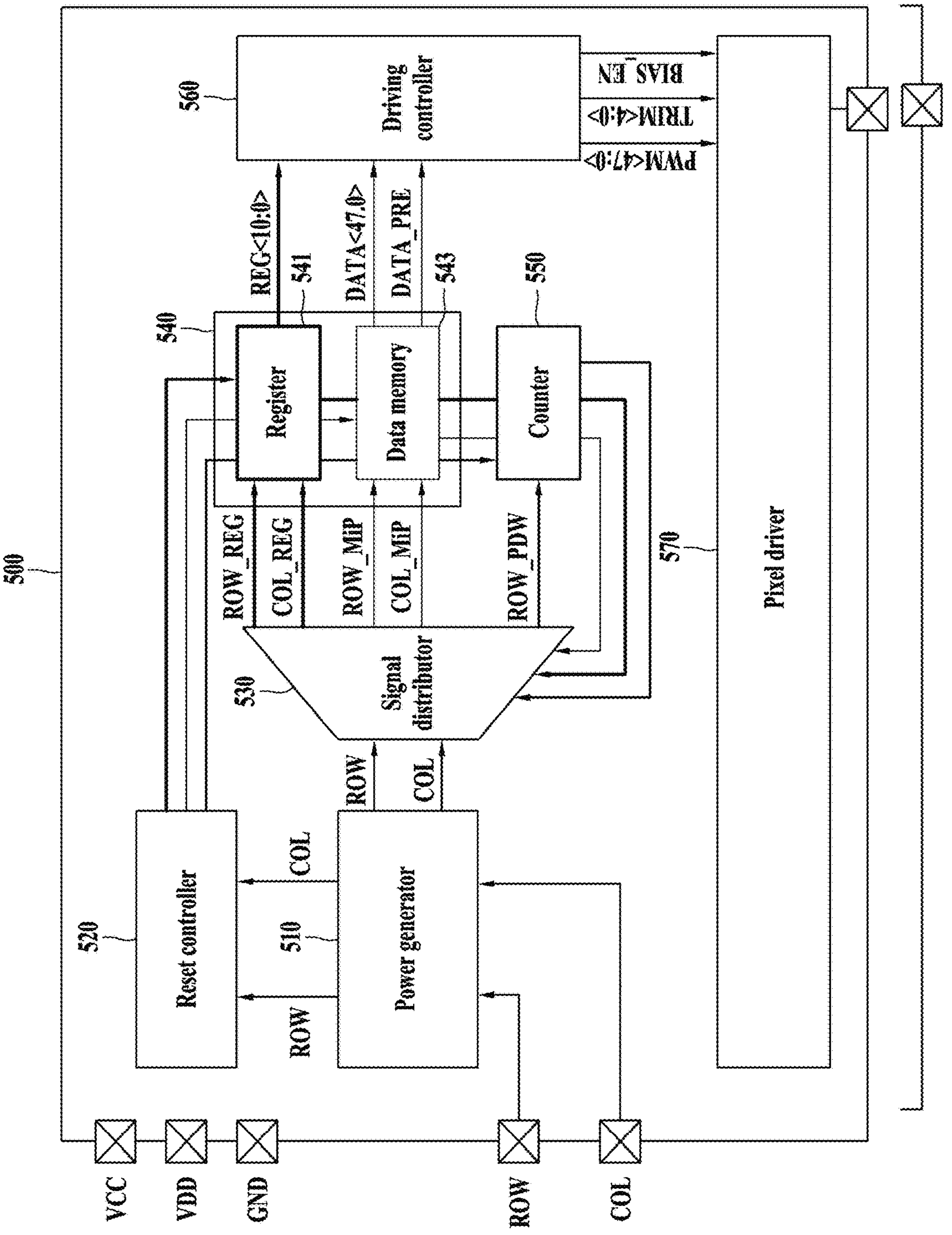
FIG. 5 illustrates an example schematic configuration of a pixel driving circuit according to another embodiment of the present disclosure.

FIG. 5 illustrates an example schematic configuration of a pixel driving circuit according to another embodiment of the present disclosure.

Referring to FIG. 5, the pixel driving circuit includes a power generator 510, a driving controller 560, and a pixel driver 570, which are typically included in a conventional pixel driving circuit. To selectively control display pixels, the pixel driving circuit may further include a reset controller 520, a signal distributor 530, a pixel-embedded memory 540, and a counter 550.

The reset controller 520 may control the initialization of the pixel-embedded memory 540 and generate a reset signal for selectively driving data updates for display pixels.

The reset signal may be generated based on a row signal and a column signal input from the host of the display device. The specific characteristics of the reset signal will be explained with reference to FIG. 6.

The reset signal may be used to initialize at least one of the register 541, a data memory 543, and the counter 550. Additionally, by using a flag signal corresponding to the reset signal, the mode for controlling the partial data writing state may be changed.

The signal distributor 530 determines the signal path based on the reset signal. The signal distributor 530 may be a demultiplexer for controlling the signal path.

The signal distributor 530 may control the output path of the row signal and column signal input from the power generator 510.

The row signal output to the register 541 based on the path control of the signal distributor 530 may be denoted as ROW_REG, and the column signal may be denoted as COL_REG.

The row signal output to the data memory 543 based on the path control of the signal distributor 530 may be denoted as ROW_MiP, and the column signal may be denoted as COL_MiP.

The row signal output to the counter 550 based on the path control of the signal distributor 530 may be denoted as ROW_PDW. Here, a column signal may also be output to the counter 550 based on the path control of the signal distributor 530, and the column signal input to the counter 550 may be denoted as COL_PDW. Here, "PDW" stands for Partial Data Write.

The pixel-embedded memory 540 includes a register 541 and a data memory 543.

The pixel-embedded memory 540 stores digital data related to driving a light-emitting element and may be selectively connected to the signal distributor 530.

The register 541 may be initialized by the reset signal and stores data for controlling pixel operation characteristics and the driving of the light-emitting element.

The data memory 543 may store image data related to the gradation of the light-emitting element.

The counter 550 counts a predetermined data write time for the data memory 543. Here, the counting of the predetermined data write time may be performed based on the number of toggle cycles of the row signal, the number of rising edges of the row signal, or the number of falling edges of the row signal.

Accordingly, the counter 550 may count a predetermined data write time in the partial data writing mode, which selectively drives data updates for at least one display pixel of the display device.

In this case, the counter 550 may count the time at which the data writing for the display pixels requiring data updates in the display device is completed based on the row signal (ROW_PDW).

Figure 6:
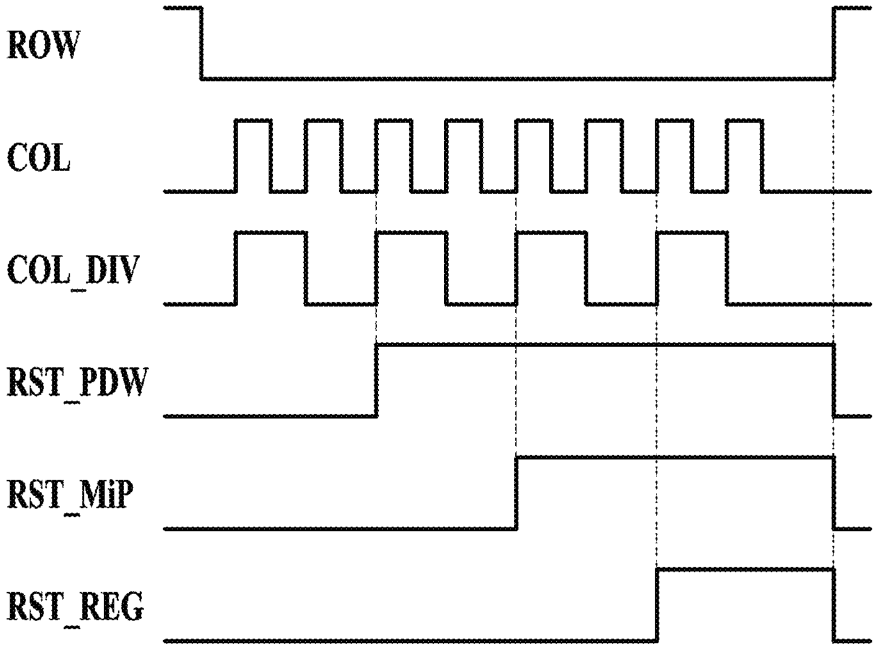
FIG. 6 is an example timing diagram for explaining the operation of generating a reset signal in the reset controller shown in FIG. 5.

FIG. 6 is a timing diagram for explaining the operation of generating a reset signal in the reset controller 520 shown in FIG. 5.

Referring to FIG. 6, the reset controller 520 may generate a first reset signal when the column signal completes M toggle cycles within the logic-low time period of the row signal, wherein M is equal to or greater than ($M \geq 3$).

In this case, the first reset signal may be denoted as RST_PDW, and the logic high (H) level of RST_PDW may indicate the termination of the partial data writing mode. Here, if the partial data writing mode is represented as "MODE 2", the first reset signal may be a flag signal indicating the deactivation of MODE 2.

The reset controller 520 may generate a second reset signal when the column signal completes N toggle cycles within the logic-low time period of the row signal, wherein N is greater than ($N > M$). In this case, the second reset signal may be denoted as RST_MiP, and the logic high (H) level of RST_MiP may indicate the termination of data writing to the pixel-embedded memory. Here, if data writing is represented as "MODE 1", the second reset signal may be a flag signal indicating the deactivation of MODE 1.

The reset controller 520 may generate a third reset signal when the column signal completes K toggle cycles within the logic-low time period of the row signal, wherein K is greater than N ($K > N$).

In this case, the third reset signal may be denoted as RST_REG, and the logic high (H) level of RST_REG may indicate the reset of the register or the termination of register writing. Here, if register reset is represented as "MODE 0", the third reset signal may be a flag signal indicating the deactivation of MODE 0 or the execution of register reset.

In this context, M may be 3, N may be 5, and K may be 7. Alternatively, for a more stable driving mode transition, M may be set to 5, in which case N may be 9, and K may be 11 or greater.

When using the number of toggle cycles of the column signal for generating the reset signal, there is an advantage in that it is unnecessary to precisely distinguish between rising edges and falling edges, as the method does not differentiate between them.

Additionally, compared to the case where the host simply inputs a digital signal of 1 or 0 to control the selective control of display pixels or the partial data writing mode, using three or more toggle cycles may reduce mode selection errors and enable what may be referred to as fine control of data writing on-duty control.

In FIG. 6, COL_DIV represents a clock signal generated by a clock divider when necessary for controlling the clock count. For example, a clock divider may be used to generate a clock signal that has twice the toggling interval of the column signal.

Figure 7:
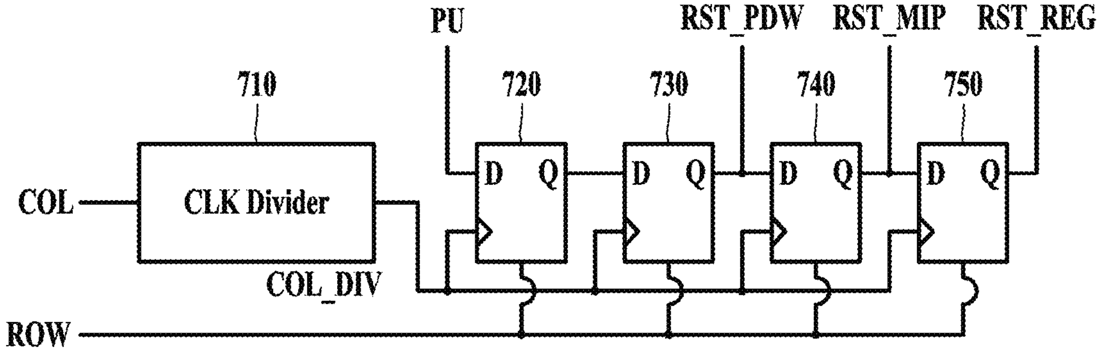
FIG. 7 illustrates the configuration of the reset controller shown in FIG. 5.

FIG. 7 illustrates the configuration of the reset controller 520 shown in FIG. 5.

Referring to FIG. 7, the reset controller 520 may include a clock divider 710 and a plurality of flip-flops 720, 730, 740, 750.

Although the example shown in FIG. 7 includes four flip-flops, the reset controller 520 may include an appropriate number of flip-flops to generate each reset signal shown in FIG. 6.

As shown in FIG. 7, the ROW signal may be input as an enable signal to each of the flip-flops 720, 730, 740, 750.

The RST_PDW signal shown in FIG. 6 may be output from the second flip-flop 730 using the output signal of the first flip-flop 720, the COL_DIV signal, and the ROW signal. The data signal input of the third flip-flop 740 may be the RST_PDW signal output from the second flip-flop 730, and the COL_DIV signal may be input to the clock signal input terminal of the third flip-flop 740.

The RST_MiP signal may be output from the signal output terminal of the third flip-flop 740.

The data signal input of the fourth flip-flop 750 may be the RST_MiP signal output from the third flip-flop 740, and the COL_DIV signal may be input to the clock signal input terminal of the fourth flip-flop 750.

The RST_REG signal may be output from the output terminal of the fourth flip-flop 750.

Figure 8:
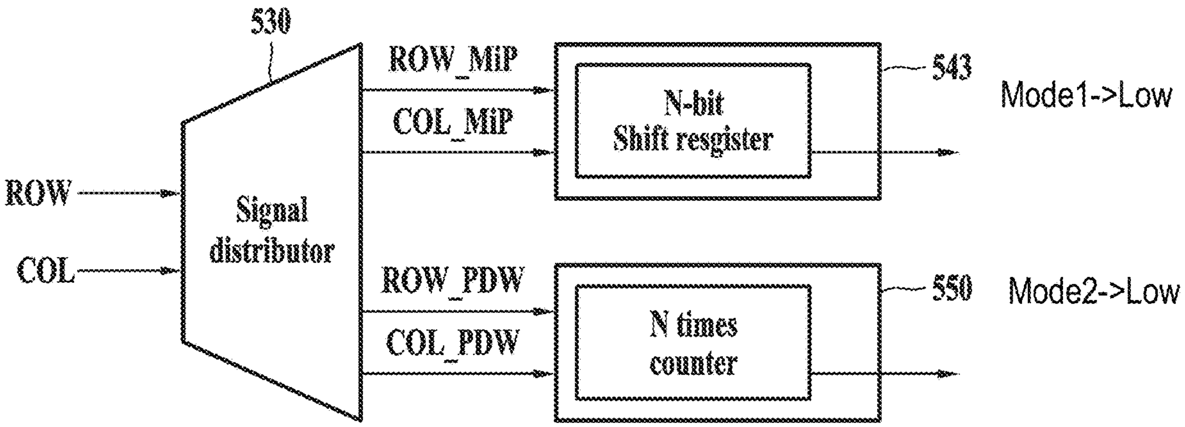
FIGS. 8 and 9 are example diagrams for explaining examples of path control in the signal distributor shown in FIG. 5.
Figure 9:
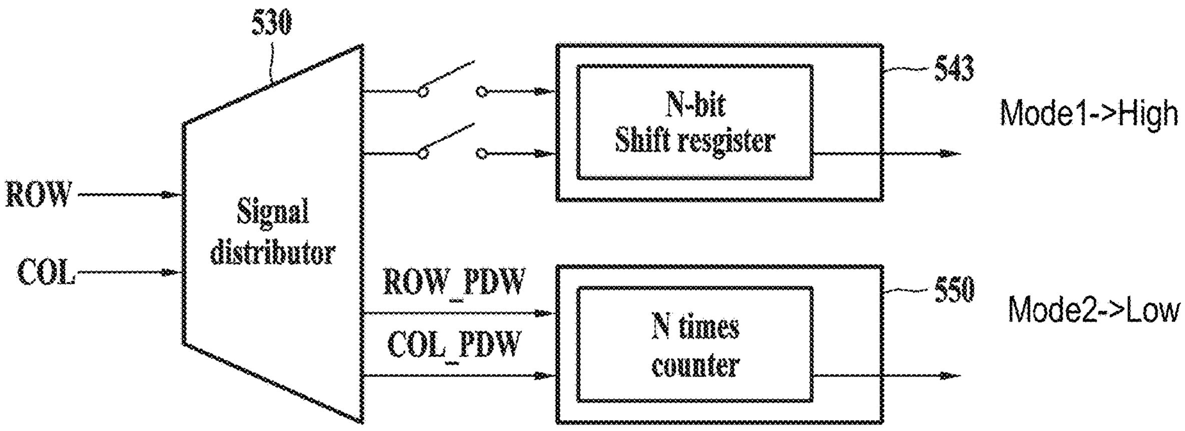

FIGS. 8 and 9 are example diagrams for showing path control in the signal distributor shown in FIG. 5.

The diagram shown in FIGS. 8 and 9 illustrate cases where the register 541 shown in FIG. 5 is omitted for brevity. In the case of the register 541, once a data writing operation is performed, no row signal or column signal is input for one frame or scan period.

FIG. 8 illustrates a pixel drive circuit operating in the partial update mode, in which a display pixel may display changing images thereon. In the partial update mode, the data memory 543 may be connected to signal distributor 530 via two signal paths, and receive row signals ROW_MiP from the row line, and column signals COL_MiP from the column line. The data memory 543 may store the pixel data to drive the light-emitting elements of the pixel from the column signals COL_MiP.

A display pixel in the partial update mode may perform an image data update to the data memory 543 while both MODE 1 and MODE 2 are enabled. For example, a display pixel in the partial update mode where both MODE 1 and MODE 2 are at a logic-low may be located in the first region 310 of FIG. 3. Here, the signal distributor 530 connects the signal path to the column or row line so that signals are input to both the data memory 543 and the counter 550.

FIG. 9 illustrates a pixel drive circuit operating in the partial non-update mode, in which display pixels may display still images without changes thereon. In the partial non-update mode, the signal distributor 530 disconnects the signal path from the column or row line, so that the data memory 543 may have no signal paths to connect with the signal distributor 530. Specifically, the two signal paths for receiving row signals ROW_MiP and column signals COL_MiP are disconnected. As a result, a display pixel does not perform an image data update to the data memory 543 in the partial non-update mode, where MODE 1 is disabled, and MODE 2 is enabled.

A display pixel operating as shown in FIG. 9 may be located in the second region 320 of FIG. 3.

Here, the signal distributor 530 may block the signal output to the data memory 543 and control the signal path so that the signal is input to the counter 550.

Accordingly, the signal distributor 530 may output or block the row signal (ROW) and the column signal (Column) to the pixel-embedded memory 540 based on the first flag signal, second flag signal, and third flag signal, which correspond to the first reset signal, second reset signal, and third reset signal, respectively.

Additionally, the signal distributor 530 may output or block the row signal to the counter 550 based on the first flag signal, second flag signal, and third flag signal.

More specifically, the signal distributor 530 may block the row signal and column signal output to the data memory 543 and output the row signal to the counter 550 when the partial data writing mode is activated by the first flag signal and the pixel-embedded memory writing mode is deactivated by the second flag signal.

Figure 10:
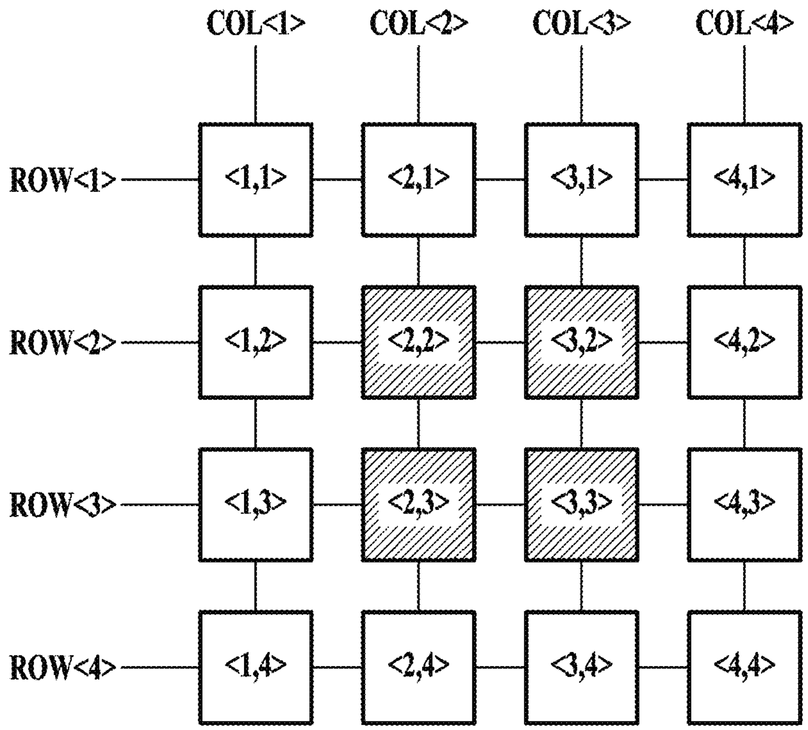
FIG. 10 is an example diagram for explaining an example of selectively controlling display pixels according to an embodiment of the present disclosure.

FIG. 10 is a diagram for explaining an example of selectively controlling display pixels according to an embodiment of the present disclosure.

As shown in FIG. 10, the display pixels that require image data updates and correspond to the first region 310 of FIG. 3 are <2,2>, <3,2>, <2,3>, and <3,3>. The display pixels other than <2,2>, <3,2>, <2,3>, and <3,3> do not require image updates.

In the example of FIG. 10, display pixels connected to the same row line may receive the same row signal pattern.

For example, the display pixels <1,1>, <2,1>, <3,1>, and <4,1> connected to row line ROW<1> may receive the same row signal from the host.

Figure 11A:
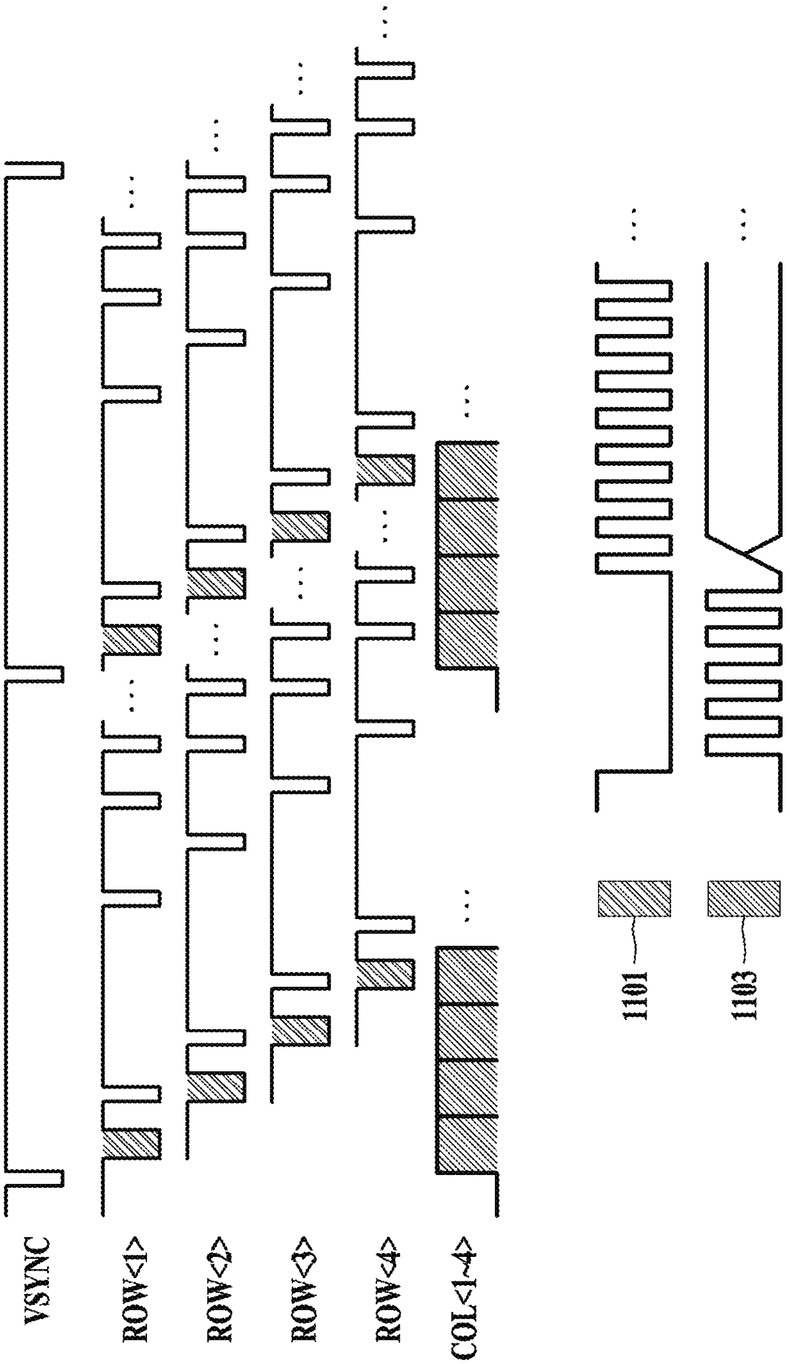
FIG. 11A illustrates an example timing diagram for controlling display pixels according to the prior art.
Figure 11B:
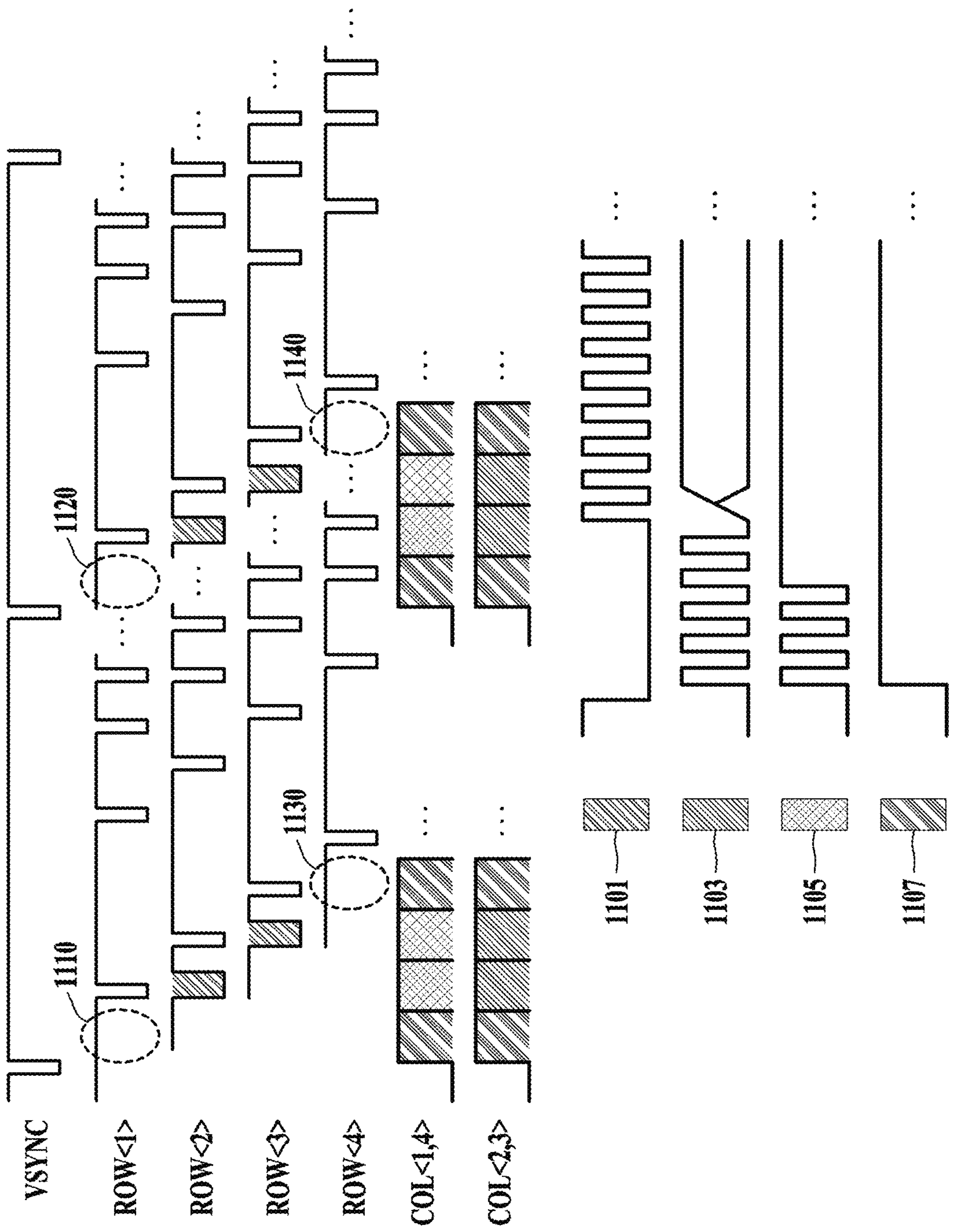
FIG. 11B illustrates an example timing diagram for selectively controlling display pixels as shown in FIG. 10.

FIG. 11A illustrates a timing diagram for controlling display pixels without the partial data write mode, while FIG. 11B illustrates a timing diagram for selectively controlling the display pixels shown in FIG. 10.

Referring to FIG. 11A, in a display device, where data writing and light-emitting element driving may be performed based on the same row signal pattern and same column signal pattern 1103, including the initial time period 1101 of the row signal.

Here, the initial time period 1101 of the row signal may be referred to as a first signal pattern, which includes a predetermined-length logic-low interval and a toggling signal.

Referring to FIG. 11B, the display device according to an embodiment of the present disclosure may output a second signal pattern that does not include the first signal pattern to row lines ROW<1> and ROW<4>. That is, the initial time periods 1110, 1120, 1130, 1140 of the second signal pattern are composed of logic high, forming a different pattern from the first signal pattern.

Meanwhile, row lines ROW<2> and ROW<3> output the first signal pattern. Accordingly, in the partial data writing mode, when the row signal input to the pixel driving circuit corresponds to a row line that includes display pixels requiring an image data update, the row signal may be input as a first signal pattern, which includes a predetermined logic-low time period.

For example, in the example shown in FIG. 10, row line ROW<2> includes <2,2> and <3,2>, which require image data updates. Therefore, the row signal of the first signal pattern is input to display pixels <2,2> and <3,2>.

Additionally, in the partial data writing mode, when there are no display pixels requiring digital data updates in the same row line, the row signal may be input to the display pixels as a second signal pattern, which does not include a predetermined logic-low time period.

For example, in the embodiment shown in FIG. 10, the display pixels connected to row lines ROW<1> and ROW<4> do not need image data updates and may receive a row signal of the second signal pattern.

In the partial data writing mode, the column signal may be configured according to the patterns indicated by reference numerals 1103, 1105, or 1107.

When a display pixel requiring an image data update is included in the same column line, a third signal pattern 1103, which includes N toggle cycles, may be input to the display pixels requiring an image data update. That is, the third signal pattern 1103 may be a controlled signal that is input to display pixels requiring an image data update within a predetermined logic-low time period.

Additionally, when a display pixel requiring an image data update is included in the same column line, a fourth signal pattern 1105, which includes M toggle cycles (where M is less than N), may be input to display pixels that do not require an image data update. The fourth signal pattern 1105 may be a controlled signal that is input to display pixels not requiring an image data update within a predetermined logic-low time period.

For example, in the embodiment shown in FIG. 10, the column signal input to the display pixels from column lines COL<1> and COL<4> may be a signal composed of a non-toggling pattern 1107 and the fourth signal pattern 1105. In the embodiment shown in FIG. 10, the column signal input to the display pixels from column lines COL<2> and COL<3> may be a signal composed of a non-toggling pattern 1107 and the third signal pattern 1103.

Figure 12:
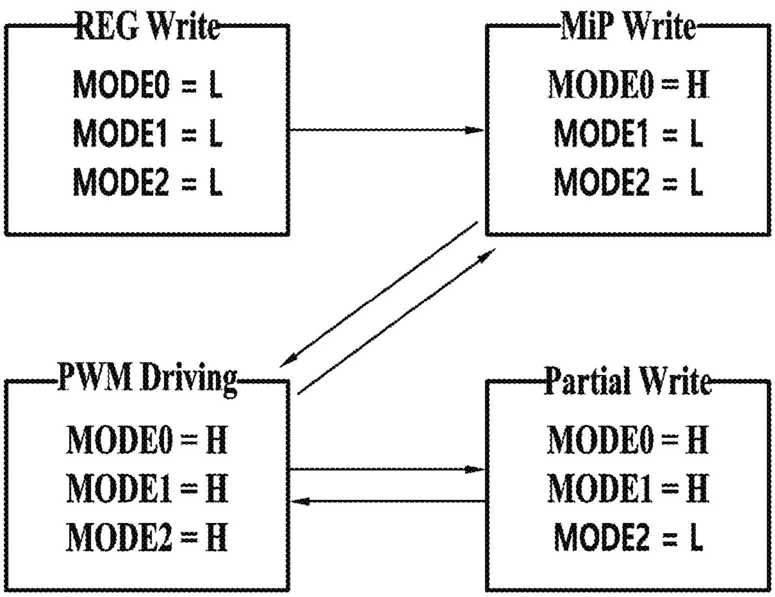
FIG. 12 illustrates an example state diagram for explaining a method of selectively controlling display pixels according to an embodiment of the present disclosure.

FIG. 12 illustrates a state diagram for explaining a method of selectively controlling display pixels according to an embodiment of the present disclosure.

Referring to FIG. 12, the operating state of a display pixel may change according to the flag signals for MODE 2, MODE 1, and MODE 0.

The flag signals for MODE 2, MODE 1, and MODE 0, as well as the path control of the signal distributor 530, are summarized in Table 1 below.

TABLE 1

| | | | | Signal path | | |
|---|---|---|---|---|---|---|
| | MODE status | | | | Pixel-embedded | |
| INDEX | MODE 0 | MODE 1 | MODE 2 | Register | memory | Counter |
| 1 | L | L | L | ○ | X | X |
| 2 | H | L | L | X | ○ | ○ |
| 3 | H | H | H | X | ○ | X |
| 4 | H | H | L | X | X | ○ |

Referring to Table 1, the flag signals for MODE 0, MODE 1, and MODE 2 are represented as H (High) and L (Low), while signal blocking is indicated by X, and signal output is indicated by O.

INDEX 1 in Table 1 may indicate a state where register writing operation is activated when MODE 0 is at logic-low, and no signals are input to the pixel-embedded memory or counter.

INDEX 3 may indicate a state where PWM (Pulse Width Modulation) driving for the light-emitting element is performed.

INDEX 2 may indicate a partial update mode, as illustrated in FIG. 8. In INDEX 2, the pixel-embedded memory may be connected to the signal distributor via a signal path and be updated with subsequent pixel image data.

INDEX 4 may indicate a partial non-update mode, as illustrated in FIG. 9. In INDEX 4, the pixel-embedded memory may be disconnected from the signal distributor without being updated with new pixel image data.

Figure 13:
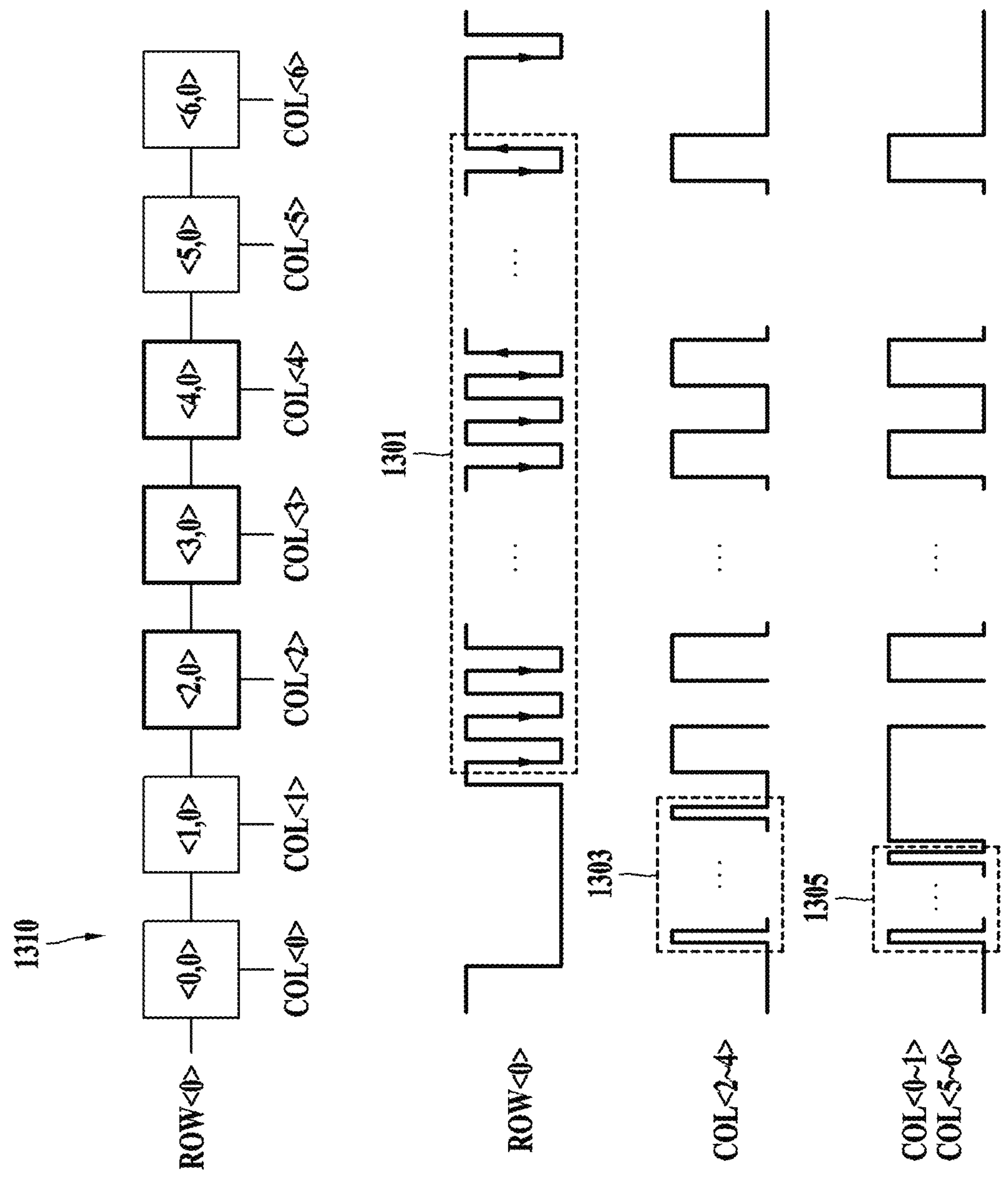
FIG. 13 is an example diagram for explaining an example of selectively controlling display pixels based on display pixels connected to a single column.

FIG. 13 is an example diagram for explaining an example of selectively controlling display pixels based on display pixels connected to a single column.

FIG. 13 illustratively shows a single row line 1310, where display pixels connected to the same row line may receive the same row signal ROW<0>.

Among the display pixels connected to the same row line 1310, the pixels requiring an image data update are <2,0>, <3,0>, and <4,0>. At this time, the row signal ROW<0> may include a predetermined logic-low time period and a toggling interval 1301 corresponding to the data writing period.

In the example of FIG. 5, the counter 550 may recognize the end of the data writing time by counting the toggling interval 1301 corresponding to the data writing period.

A flag indicating the end of the data writing time may be input to the reset controller 520 and/or the signal distributor 530.

The column signals input to display pixels <2,0>, <3,0>, and <4,0> may include a toggling interval 1303 for activating MODE 2. The column signals are input to display pixels other than <2,0>, <3,0>, and <4,0> may include a toggling interval 1305 for activating MODE 2.

The devices described above may be implemented using hardware components, software components, and/or a combination of hardware and software components. For example, the devices and components (e.g., controller 140, determination unit 410, and signal distributor 530 described in the embodiments may be implemented using one or more general-purpose computers or special-purpose computers, such as a processor, controller, arithmetic logic unit (ALU), digital signal processor (DSP), microcomputer, field programmable array (FPA), programmable logic unit (PLU), microprocessor, or any other device capable of executing and responding to instructions.

A processing device may execute an operating system (OS) and one or more software applications running on the OS. Additionally, in response to software execution, the processing device may access, store, manipulate, process, and generate data.

For ease of understanding, the processing device may be described as a single unit, but those skilled in the art will understand that the processing device may include multiple processing elements and/or multiple types of processing elements.

For example, the processing device may include multiple processors or a combination of a processor and a controller. Additionally, other processing configurations, such as parallel processors, are also possible.

Software may include a computer program, code, instructions, or any combination thereof, and it may configure the processing device to operate as intended or collectively command the processing device independently or in combination.

Software and/or data may be permanently or temporarily embodied in any type of machine, component, physical device, virtual equipment, computer storage medium or device, or transmitted signal wave for interpretation by or to provide commands or data to the processing device.

Software may also be distributed across networked computer systems, allowing it to be stored or executed in a distributed manner.

Software and data may be stored on one or more computer-readable recording media.

The methods according to the embodiments may be implemented as program instructions that may be executed through various computer-based means and may be recorded on computer-readable media.

The computer-readable media may individually or in combination include program instructions, data files, and data structures.

The program instructions recorded on the media may be specifically designed and configured for the embodiments or may be commercially available and commonly used by software developers.

Examples of computer-readable recording media include magnetic media such as hard disks, floppy disks, and magnetic tapes; optical media such as CD-ROMs and DVDs; magneto-optical media such as floptical disks; and hardware devices specifically configured to store and execute program instructions, such as ROM, RAM, and flash memory.

Examples of program instructions include machine code generated by a compiler and high-level language code that may be executed by a computer using an interpreter.

The aforementioned hardware devices may be configured to operate as one or more software modules to perform the functions of the embodiments, and vice versa.

Although the embodiments have been described with reference to limited diagrams, those skilled in the art will recognize that various modifications and variations may be made based on the above disclosure.

For example, the described technologies may be executed in an order different from the described method, and/or the components of the described systems, structures, devices, and circuits may be combined, arranged, replaced, or substituted in different ways while still achieving the desired results.

Therefore, other implementations, other embodiments, and equivalents to the claimed scope also fall within the scope of the following claims.

What is claimed is:

1. A pixel driving circuit for a display device, comprising:

a data driving circuit configured to output control signals indicating operation modes and a data signal indicating image data through a column line or a row line; and an array of a plurality of pixels, each pixel including:

a light-emitting element, and a pixel-embedded memory configured to receive the data signal from the column or row line via a first signal path, and configured to store the image data to drive the light-emitting element of a pixel; and a signal distributor configured to connect the first signal path to or disconnect the first signal path from the column or row line based on the operation modes, wherein the operation modes comprise a partial update mode and a partial non-update mode;

wherein the signal distributor is configured to connect the first signal path to the column or row line based on the partial update mode; and wherein the signal distributor is configured to disconnect the first signal path from the column or row line based on the partial non-update mode.

2. The pixel driving circuit according to claim 1, wherein a main memory configured to store image data to illustrate images for the array of the plurality of pixels; and a processor configured to compare two sequential images and based on a result of the comparison, to determine:

a first region of the array of the plurality of pixels to update pixel-embedded memories of pixels within the first region; and a second region of the array of the plurality of pixels not to update pixel-embedded memories of pixels within the second region.

3. The pixel driving circuit according to claim 2, wherein the data driving circuit is configured to output a first control signal indicating the partial update mode to pixels within the first region, and a second control signal indicating the partial non-update mode to the pixels within the second region.

4. The pixel driving circuit according to claim 3, wherein the first control signal comprises a first number of toggles, and the second control signal comprises a second number of toggles.

5. The pixel driving circuit according to claim 1, wherein the pixel-embedded memory comprises:

a data memory storing multi-bit digital data representing a gradation level for the light-emitting element.

6. The pixel driving circuit according to claim 4, further comprising a counter configured to count a number of toggles of the first control signal or the second control signal.

7. The pixel driving circuit according to claim 6, wherein:

when a column line signal indicates the partial update mode, the column line signal comprises a first signal pattern including N toggle cycles occurring within a logic-low time period of a row line signal; and when the column line signal indicates the partial non-update mode, the column line signal comprises a second signal pattern including M toggle cycles occurring within the logic-low time period of the row line signal, wherein M is less than N.

8. The pixel driving circuit according to claim 6, wherein:

the signal distributor is configured to selectively route signals based on reset signals generated by a reset controller, wherein the reset controller is configured to:

generate a first reset signal indicating a termination of the partial update mode when the column signal performs M toggle cycles within a logic-low time period of the row signal, wherein M is greater than 3; and generate a second reset signal indicating a termination of writing the image data to the pixel-embedded memory when the column signal performs N toggle cycles within the logic-low time period of the row signal, wherein N is greater than M.

9. A method performed by a pixel driving circuit for a display device, the pixel driving circuit including a data driving circuit and an array of a plurality of pixels, each pixel including a light-emitting element, a pixel-embedded memory, and a signal distributor, the method comprising:

outputting, by the data driving circuit, control signals indicating operation modes and a data signal indicating image data through a column line or a row line;

connecting, by the signal distributor, a first signal path between the column line or the row line and the pixel-embedded memory based on a partial update mode included in the operation modes;

disconnecting, by the signal distributor, the first signal path from the column line or the row line based on a partial non-update mode included in the operation modes; and in response to the first signal path being connected, receiving, by the pixel-embedded memory, the data signal via the first signal path and storing the image data, wherein the stored image data is used to drive the light-emitting element of the pixel.

* * * * *